(12) United States Patent  (10) Patent No.: US 7,283,268 B2
Johnson  (45) Date of Patent: Oct. 16, 2007

(54) PRINTER WITH INTERPRETER

(75) Inventor: Kelly L. Johnson, Centerville, OH (US)

(73) Assignee: Paxar Corporation, White Plains, NY (US)

( * ) Notice: Subject to any disclaimer, the term of this patent is extended or adjusted under 35 U.S.C. 154(b) by 747 days.

(21) Appl. No.: 10/193,557

(22) Filed: Jul. 11, 2002

(65) Prior Publication Data

US 2004/0008361 A1  Jan. 15, 2004

(51) Int. Cl.
G06F 3/12 (2006.01)
G06F 15/00 (2006.01)
(52) U.S. Cl. ........................ 358/1.15; 358/1.9
(58) Field of Classification Search ............... 358/1.18, 358/1.16, 1.15, 1.14, 1.13, 1.1; 395/117
See application file for complete search history.

(56) References Cited

U.S. PATENT DOCUMENTS 5,226,112 A * 7/1993 Mensing et al. ........... 358/1.15
5,483,624 A * 1/1996 Christopher et al. ....... 358/1.18
6,331,895 B1 * 12/2001 Erickson et al. ........... 358/1.13
6,411,397 B1 * 6/2002 Petteruti et al. ........... 358/1.18

* cited by examiner

Primary Examiner—Douglas Q. Tran
(74) Attorney, Agent, or Firm—Banner & Witcoff, Ltd.

(57) ABSTRACT

A printer for printing on a web of record members such as labels, tags, etc. includes an interpreter and a memory for storing an application program. The interpreter is enabled or disabled by the receipt of a command. When enabled, the interpreter processes an application program to extract data from a received data stream and to construct one or more data packets in a predetermined printer control language to be sent to a parser. When the interpreter is disabled, the received data is sent to the parser bypassing the interpreter. The printer of the present invention is thus operable to print received data with or without an application program.

20 Claims, 3 Drawing Sheets

PRINTER WITH INTERPRETER

CROSS-REFERENCE TO RELATED APPLICATIONS

N/A

STATEMENT REGARDING FEDERALLY SPONSORED RESEARCH OR DEVELOPMENT

N/A

FIELD OF INVENTION

The present invention is directed to a printer for printing on a web of record members such as labels, tags, etc. and more particularly to such a printer having an application program and interpreter that can be enabled or disabled to allow the printer to be operated to print with or without an application program.

BACKGROUND OF THE INVENTION

Label/tag printers are known that include an application program stored in a programmable memory and an interpreter for processing all data input to the printer in accordance with the application program as shown in U.S. Pat. No. 5,483,624. These printers can manipulate received data in accordance with the application program but they are not operable to print without an application program. Other label/tag printers are known that receive data in a predetermined format for printing; however, these printers cannot manipulate the received data and can only print data if it is received in the predetermined format.

BRIEF SUMMARY OF THE INVENTION

In accordance with the present invention, the disadvantages of prior label/tag printers have been overcome. The printer of the present invention includes and interpreter and a memory for storing an application program wherein the interpreter can be enabled or disabled to allow the printer to be operated to print with or without an application program.

More particularly, the printer of the present invention includes a printing module having a printhead and a motor for driving the web of record members past the printhead for printing thereon. The printer includes a communication interface for receiving commands and various data streams. An image generator is responsive to printer data for generating record member image data that is coupled to the printhead for printing. A printer control language parser is responsive to data in a predetermined printer control language for parsing the printer control language data to the image generator. The interpreter, when enabled, processes a stored application program to extract data from a received data stream and to construct therefrom one or more data packets in the predetermined printer control language to be sent to the parser. An executive processor is responsive to the receipt of an enable command to send subsequently received data streams to the interpreter and is responsive to a disable command to send subsequently received data streams to the parser, bypassing the interpreter.

The printer of the present invention processes data for printing faster when the interpreter is bypassed; however, the printer is extremely flexible in that it can be operated in accordance with an application program to manipulate data received by the printer. These and other advantages and novel features of the present invention, as well as details of an illustrated embodiment thereof, will be more fully understood from the following description and drawings.

DETAILED DESCRIPTION OF THE INVENTION

Figure 1:
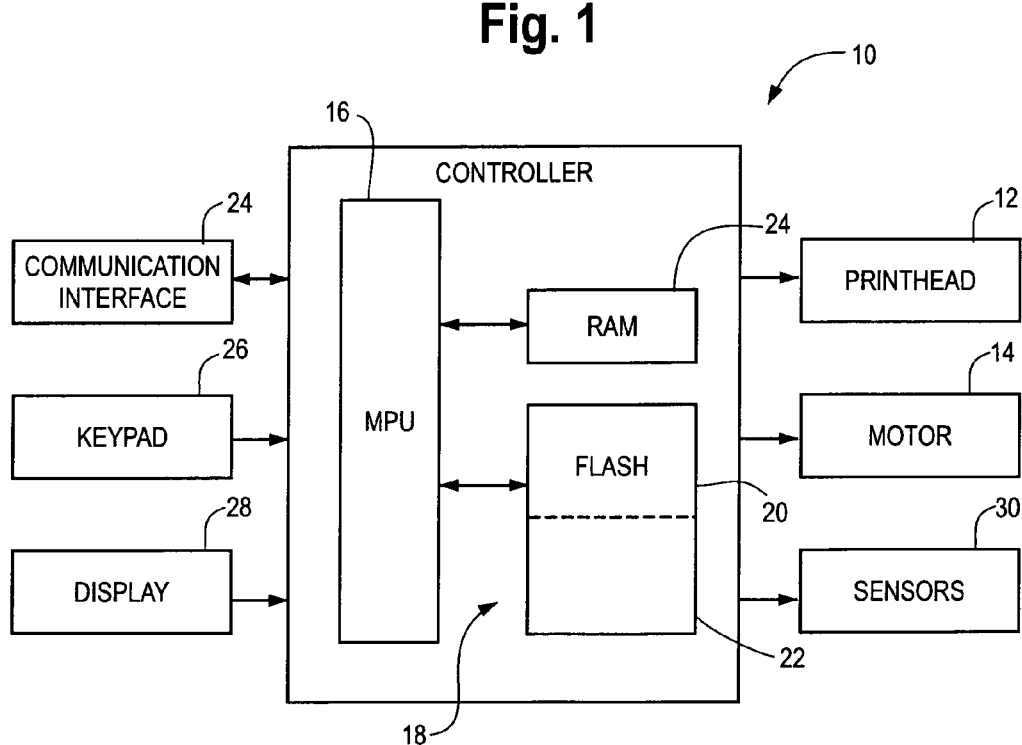
FIG. 1 is a block diagram of the printer of the present invention.

The printer 10 of the present invention includes a printhead 12, that may be a thermal printhead or the like and a motor 14 for driving a web of record members, such as labels, tags, etc. past the printhead 12 for printing thereon. The information printed on a record member is determined by a microprocessor 16 operating in accordance with firmware/software stored in a flash memory 18 and data stored in a RAM 24.

The flash memory 18 includes an area 22 to which access is restricted, the area 22 of the flash memory 18 storing the firmware of the printer 10. An unrestricted area 20 of the flash memory 18 stores an application program that can be downloaded into the printer 10 via a communication interface. It is noted, that the area 22 of the flash memory may be restricted such that a special loader is required to write to the area 22 of the flash memory. It should be apparent, however, that other methods of restricting or limiting access to the flash memory area 22 may also be employed. In an alternative embodiment, the application program may be stored in other types of programmable, non-volatile memories such as a battery-backed RAM. Similarly, the firmware of the printer 10 may be stored in a ROM-type of memory such as an EPROM or an EEPROM. The printer 10 receives data and commands via a communication interface 24. The communication interface 24 may include a radio frequency transceiver and/or one or more communication ports such as a RS 232 port. The printer 10 includes a keypad 26 with a number of keys actuable by a user to provide inputs or commands to the printer 10. The keypad inputs may be used to initiate various operations of the printer such as to control the motor 14 to advance a web of record members or to control the printer 10 to provide various status information. In another embodiment, the keypad 26 is also used to enter data to be printed. A display 28 is used to provide a menu to the user. The display 28 is utilized to prompt the user to make various selections via the keypad 26 and to display status information. The printer 10 includes a number of sensors 30. These sensors are used to register a web of record members with the printhead 12, to sense the temperature of the printhead 12, to monitor a battery if the printer is battery powered, etc.

Figure 2:
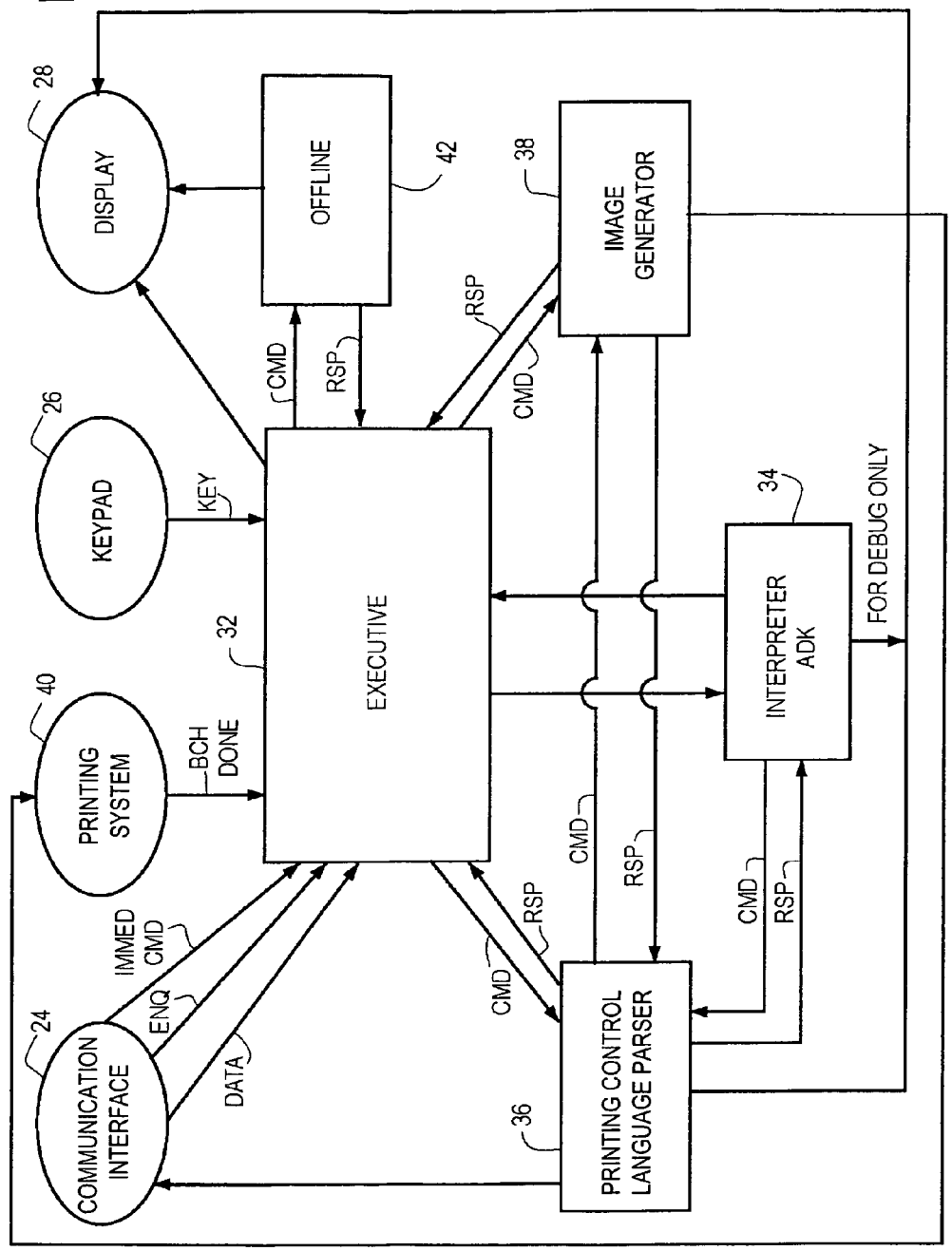
FIG. 2 is a block diagram of the firmware and hardware interface for the printer of FIG. 1.

As shown in FIG. 2, the firmware of the printer 10 includes an executive task 32, which when implemented by the microprocessor 16, is responsive to inputs received by the communication interface 24 and the keypad 26 to process immediate commands and inquiries and to determine whether received data is to be processed via an interpreter 34 in accordance with an application program stored in the flash memory 18 or not, depending upon whether the interpreter is enabled or disabled as discussed below. When enabled, the interpreter 34 processes a stored application program to extract data from a received data stream, to manipulate the data, if necessary, and to construct from the extracted and/or manipulated data one or more data packets in a predetermined printer control language. The interpreter 34 sends the printer control language packets to a printer control language parser 36. The parser 36 parses the data received in the predetermined printer control language to extract format information, font information and the data to be printed on a record member. The parser sends the parsed information to an image generator task 38. The image generator task 38 when implemented by the microprocessor 16 is responsive to printer data received from the parser and the format and font information for generating record member image data. The record member image data is data arranged to form an image of the printed record member. The record member image data generated by the image generator 38 is coupled to a printing system 40 that includes the printhead 12 and the motor 14 for printing the data on a record member. The executive task 32 controls the display 28 in response to on-line commands received via the communication interface 24 or in response to off-line commands such as received from the keyboard 26 in accordance with an off-line task 42.

The executive task 32 is responsive to the receipt of an enable command to send subsequently received data streams to the interpreter 34 for processing via a stored application program. The executive task 32 is responsive to the receipt of a disable command to send subsequently received data streams directly to the parser 36, bypassing the interpreter 34 so as to allow the printer 10 to be operated to print data with or without an application program.

Figure 3:
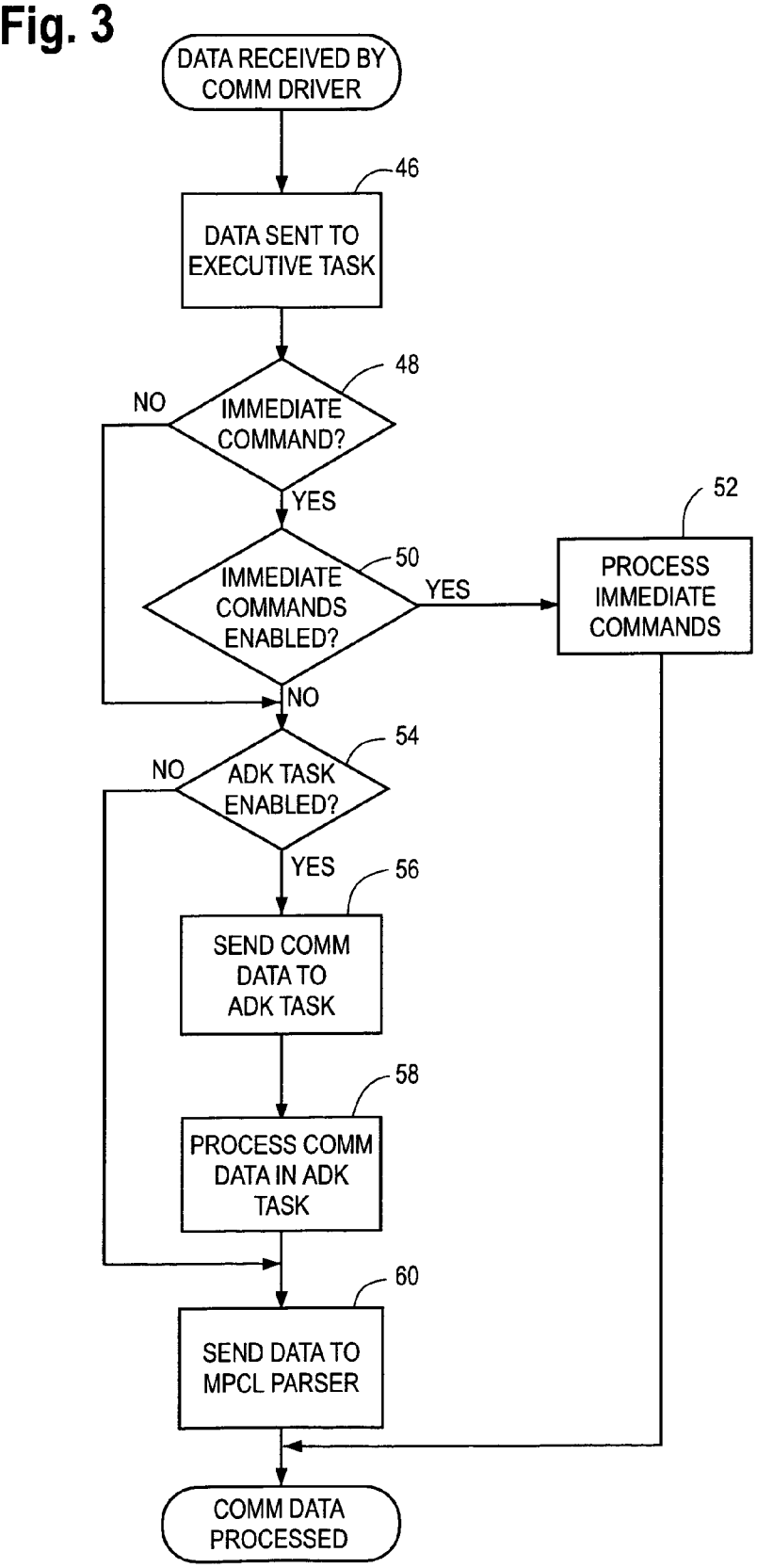
FIG. 3 is a flow chart illustrating the processing of data received by the printer of FIGS. 1 and 2.

As shown in FIG. 3, when data is received by a communication driver associated with the communication interface 24, the data is sent at block 46 to the executive task 32. The microprocessor 16 determines at block 48 whether the received information is an Immediate Command. If it is an Immediate Command, the microprocessor determines at a block 50 whether Immediate Commands have been enabled to be processed by the printer 10. If so, the microprocessor 16 processes the Immediate Command at block 52.

An example of an Immediate Command is a command that causes the printer to enter a mode to load an application program. This is an on-line mode in which the printer 10 is expecting to receive an application program and will typically not respond to print data. As each packet associated with the application program is received, the printer responds to the host computer. Alternatively, a similar Immediate Command can be used to enter a mode to load an application program but without responses being sent to the host. The command to enable and disable the interpreter 34, and thus an application program, is also an Immediate Command processed by the microprocessor 16 in accordance with the executive task at block 52. If an application program has been loaded and is stored in the flash memory 18 but is currently disabled, this command will enable the application program. If an application program has been loaded and is currently stored in the flash memory 18 and is currently enabled when the command is received, the microprocessor 16 will disable the interpreter and thus the application program. If no application has been loaded in the flash memory 18, the microprocessor 16 ignores the enable/disable command. Another Immediate Command causes the microprocessor 16 to upload via the communication interface 24 the name of the current application program stored in the flash memory 18 along with an associated version number. Another example of an Immediate Command is a command to delete the current application program in the printer 10. It is noted that when an application program is deleted it may simply be marked as deleted but need not be removed from the flash memory 18. If there is no current application program in the printer 10 when the delete command is received, the microprocessor 16 merely ignores the command. The microprocessor 16 can also respond to other types of Immediate Commands by processing the commands at block 52 upon receipt.

The microprocessor 16 in accordance with the executive task 32 proceeds to block 54 from block 48 if the information received is not an Immediate Command as determined at block 48. At block 54, the microprocessor 16 determines whether the interpreter task 34 has been enabled by a previously received Immediate Command. If the interpreter 34 has been enabled, the received data is sent to the interpreter 34 so as to be processed by the interpreter in accordance with the application program stored in the area 20 of the flash memory 18. As discussed above, the interpreter processes the stored application to extract data from a received data stream and to manipulate the data in other ways in accordance with the application program. The manipulation of data may include rearranging the data; combining received data with other data identified in the application program, etc. From the extracted and/or manipulated data, the interpreter constructs one or more data packets in the predetermined printer language that can be parsed by the parser 36. The interpreter then sends the data packets in the predetermined printer language to the parser 36 at block 60. If the interpreter 34 is disabled as determined by the microprocessor at block 54, the microprocessor 16 proceeds from block 54 directly to block 60 to send the received data directly to the parser 36, bypassing the interpreter 34.

The printer of the present invention can process received data in accordance with an application program so as to be able to handle data in a foreign printer control language, i.e. a printer language other than the predetermined printer control language to which the parser is responsive. If data is received in the predetermined printer control language, the interpreter can be disabled and the received data sent directly to the parser 36 for extremely fast throughput. This feature of the present invention allows the printer to be operated in the most efficient manner possible, with or without an application program.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A printer for printing on a web of record members comprising:

a printing module including a printhead and a motor for driving the web of record members past the printhead for printing;

a communication interface for receiving a plurality of commands and data streams;

a memory for storing an application program;

an image generator responsive to printer data for generating record member image data to be coupled to the printhead for printing;

a printer control language parser responsive to data in a predetermined printer control language for passing the data to the image generator;

an interpreter that can be enabled or disabled by a command, the interpreter when enabled processing a stored application program to extract data from a received data stream and to construct therefrom one or more data packets in the predetermined printer control language to be sent to the parser; and an processor responsive to the receipt of an enable command to send subsequently received data streams to the interpreter and responsive to a disable command to send subsequently received data streams to the parser, bypassing the interpreter.

2. A printer for printing on a web of record members as recited in claim 1 wherein the interpreter manipulates received data in accordance with the application program.

3. A printer for printing on a web of record members as recited in claim 1 wherein the application program is stored in a flash memory.

4. A printer for printing on a web of record members as recited in claim 3 wherein said interpreter includes software stored in an area of the flash memory to which access is limited.

5. A printer for printing on a web of record members as recited in claim 1 wherein the enable and disable commands form a single command to which the processor responds as an enable command if the single command is received when an application program is stored in the memory and disabled., and to which the executive processor responds as a disable command if the single command is received when an application program is stored in the memory and enabled.

6. A printer for printing on a web of record members as recited in claim 1 wherein the processor is responsive to each of a predetermined set of commands to process the commands upon receipt, bypassing the interpreter even if enabled.

7. A printer for printing on a web of record members as recited in claim 6 wherein the set of commands processed by the processor upon receipt includes the enable and disable command.

8. A printer for printing on a web of record members as recited in claim 6 wherein the set of commands processed by the processor upon receipt includes a command to load an application program into the printer.

9. A printer for printing on a web of record members as recited in claim 6 wherein the set of commands processed by the processor upon receipt includes a command to upload an application program identifier.

10. A printer for printing on a web of record members as recited in claim 6 wherein the set of commands processed by the processor upon receipt includes a command to delete a current application program.

11. A printer for printing on a web of record members comprising:
a printing module including a printhead and a motor for driving the web of record members past the printhead for printing;
a communication interface for receiving a plurality of commands and data streams;
a memory for storing an application program; and
a processor operating in accordance with a plurality of firmware tasks including:
an image generator task for generating record image data to be sent to the printhead for printing;
a parser task for parsing data in a predetermined control language to be sent to the image generator task;
an interpreter task that can be enabled or disabled, the interpreter task when enabled, processing a stored application to construct one or more data packets in the predetermined printer control language to be sent to the parser; and
an executive task receiving commands and data streams, the executive task sending data streams to the interpreter when the interpreter is enabled and sending data streams to the parser, bypassing the interpreter when the interpreter is disabled.

12. A printer for printing on a web of record members as recited in claim 11 wherein the application program is stored in a flash memory.

13. A printer for printing on a web of record members as recited in claim 11 wherein the image generator task, parser task and executive task are stored in an area of flash to which access is restricted.

14. A printer for printing on a web of record members as recited in claim 11 wherein the executive task is responsive to each of a predetermined set of commands to process the commands upon receipt, bypassing the interpreter even if enabled.

15. A printer for printing on a web of record members as recited in claim 11 wherein the set of commands processed by the executive task upon receipt includes the enable and disable command.

16. A printer for printing on a web of record members as recited in claim 11 wherein the set of commands processed by the executive task upon receipt includes a command to load an application program into the printer.

17. A printer for printing on a web of record members as recited in claim 11 wherein the set of commands processed by the executive task upon receipt includes a command to upload an application program identifier.

18. A printer for printing on a web of record members as recited in claim 11 wherein the set of commands processed by the executive task upon receipt includes a command to delete a current application program.

19. A method of operating a printer having a printhead, a motor for driving a web of record members past the printhead for printing; a communication interface for receiving commands and data streams; and a memory for storing an application program comprising:
receiving a command to enable or disable an interpreter task;
determining if the interpreter task has been enabled or disabled;
receiving a data stream;
sending the data stream to the interpreter task if enabled to construct therefrom one or more data packets in a predetermined printer control language to be sent to one or more tasks for printing; and
sending the data stream directly to the one or more tasks for printing if the interpreter is disabled.

20. A method of operating a printer as recited in claim 19 including:
receiving an immediate command; and
processing the immediate command upon receipt, bypassing the interpreter even if enabled.

* * * * *